United States Patent
Diamond et al.

(10) Patent No.: US 12,487,572 B2
(45) Date of Patent: Dec. 2, 2025

(54) ELECTRIC VEHICLE ENERGY MANAGEMENT SYSTEM

(71) Applicant: FORD GLOBAL TECHNOLOGIES, LLC, Dearborn, MI (US)

(72) Inventors: Brendan F. Diamond, Grosse Pointe, MI (US); Stuart C. Salter, White Lake, MI (US); Anthony Maraldo, Southgate, MI (US); Roman Koch, Aachen (DE); Solomon Lin, Fort Wayne, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 469 days.

(21) Appl. No.: 18/121,156

(22) Filed: Mar. 14, 2023

(65) Prior Publication Data
US 2024/0310801 A1    Sep. 19, 2024

(51) Int. Cl.
G05B 19/042    (2006.01)

(52) U.S. Cl.
CPC .... G05B 19/042 (2013.01); *G05B 2219/2639* (2013.01)

(58) Field of Classification Search
CPC .......... G05B 19/042; G05B 2219/2639; Y02T 10/70; Y02T 10/7072; Y02T 90/12; B60L 58/12; B60L 1/00; B60L 53/64; B60L 2260/52; B60L 2260/54
See application file for complete search history.

(56) References Cited

U.S. PATENT DOCUMENTS

| | | | |
|---|---|---|---|
| 8,700,255 B2 | 4/2014 | Joseph | |
| 9,811,801 B2 | 11/2017 | Gulli | |
| 2007/0282495 A1 | 12/2007 | Kempton et al. | |
| 2010/0332363 A1 | 12/2010 | Duddle et al. | |
| 2013/0046411 A1* | 2/2013 | Al Faruque | H02J 3/322 700/286 |
| 2013/0057214 A1* | 3/2013 | Stevens | B60L 53/30 320/109 |
| 2015/0039391 A1* | 2/2015 | Hershkovitz | G01R 31/382 705/7.31 |
| 2016/0052397 A1* | 2/2016 | Meyer | B60L 58/12 701/123 |
| 2017/0050529 A1* | 2/2017 | Lambert | B60L 53/14 |

FOREIGN PATENT DOCUMENTS

| | | | |
|---|---|---|---|
| CN | 104535936 B | * | 7/2017 |
| WO | 2022218641 A1 | | 10/2022 |

* cited by examiner

*Primary Examiner* — Kidest Worku
(74) *Attorney, Agent, or Firm* — Joseph Zane; Brooks Kushman P.C.

(57) ABSTRACT

A server includes an interface configured to communicate with a vehicle and a charger, and a processor configured to responsive to receiving, from the vehicle, vehicle data indicative of an energy transfer amount from the vehicle to one or more receiving entities above a transfer threshold, impose a limitation on the charger to charge the vehicle by sending a message to the charger.

20 Claims, 3 Drawing Sheets

ELECTRIC VEHICLE ENERGY MANAGEMENT SYSTEM

TECHNICAL FIELD

The present disclosure generally relates to a system and method for managing energy stored in a vehicle. More specifically, the present disclosure relates to a system for managing charging and discharging of a vehicle battery.

BACKGROUND

Electric vehicles may be provided with a traction battery for supplying electric power for propulsion. The traction battery may be further configured to supply electric power for non-propulsion purposes. For instance, once connected to a building, the electric vehicle may supply electricity to the building using power from the traction battery.

SUMMARY

In one or more illustrative embodiments of the present disclosure, a server includes an interface configured to communicate with a vehicle and a charger; and a processor configured to responsive to receiving, from the vehicle, vehicle data indicative of an energy transfer amount from the vehicle to one or more receiving entities above a transfer threshold, impose a limitation on the charger to charge the vehicle by sending a message to the charger.

In one or more illustrative embodiments of the present disclosure, a charger includes a connector configured to provide electric charge to a vehicle; and a controller, programmed to record a first milage and a first energy amount of the vehicle at an end of a first charge event, responsive to detecting the vehicle connecting to the connector to perform a second charge event, obtain a second milage and a second energy amount of the vehicle, calculate a driving distance between the first charge event and the second charge event by comparing the second milage with the first milage, calculate an expected energy amount using the driving distance, calculate an actual energy amount by comparing the first energy amount with the second energy amount, and responsive to detecting the actual energy amount being higher than the expected energy amount by a predetermined threshold, impose a limitation to charge the vehicle during the second charge event.

In one or more illustrative embodiments of the present disclosure, a method includes receiving, from a vehicle, vehicle data indicative of driving operations of the vehicle and an energy transfer from the vehicle to one or more receiving entities; and responsive to the vehicle data being indicative of excessive driving and the energy transfer being above a transfer threshold, imposing a limitation on a charger to charge the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, discloses system for managing electric energy. More specifically, the present disclosure discloses system for managing charging and discharging of a battery of an electric vehicle.

Figure 1:
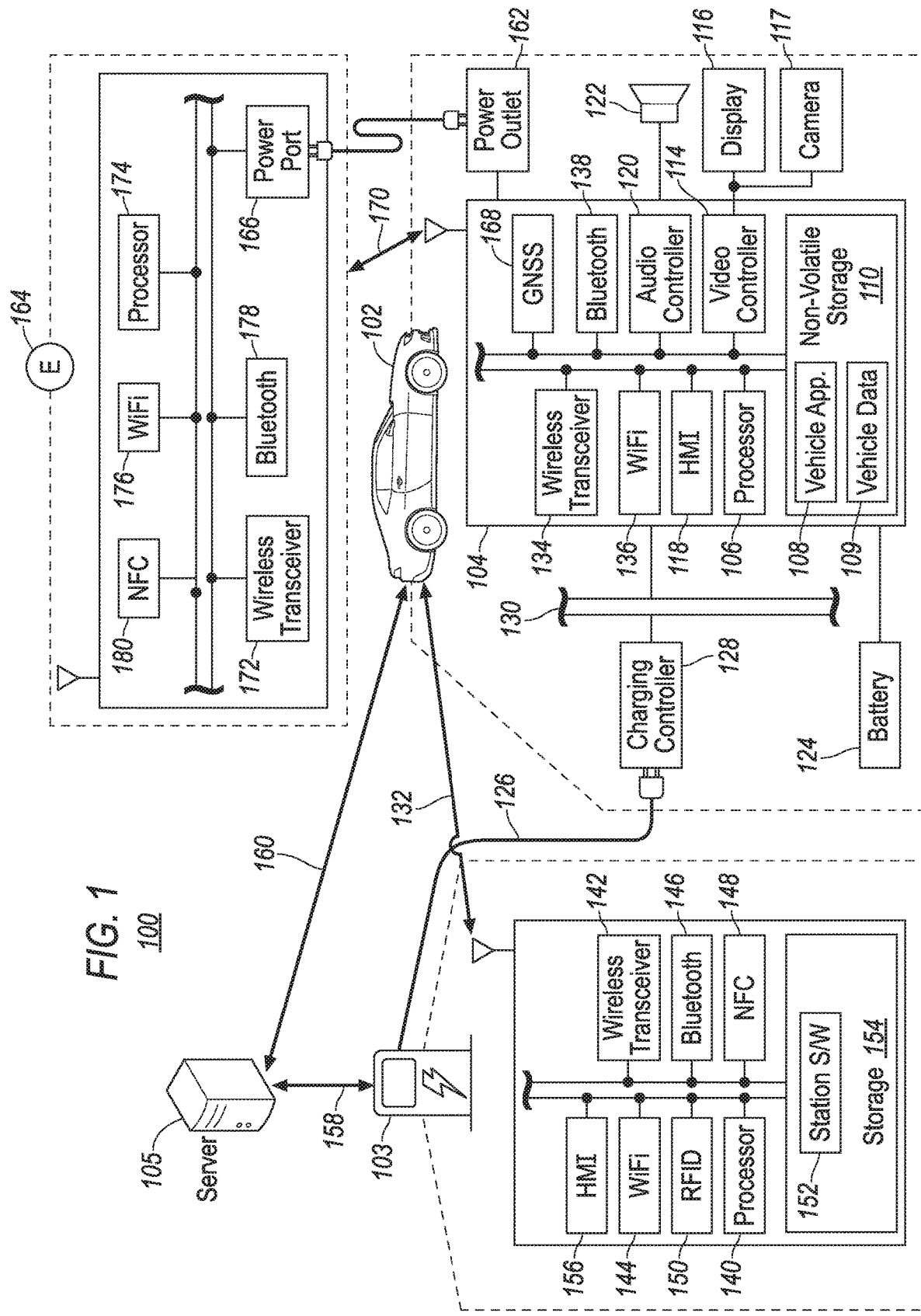
FIG. 1 illustrates an example block topology of a vehicle management system of one embodiment of the present disclosure.

Referring to FIG. 1, an example block topology of a vehicle management system 100 of one embodiment of the present disclosure is illustrated. The vehicle management system 100 may generally include a vehicle 102, a charger or electronic vehicle supply equipment (EVSE) 103, and a remote server 105. It should be noted that the illustrated system 100 is merely an example, and more, fewer, and/or differently located elements may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an electric motor using electric power supplied from a traction battery. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods.

Also illustrated in FIG. 1, a computing platform 104 of the vehicle 102 may include one or more processors 106 configured to perform instructions, commands, and other routines in support of the processes described herein. For instance, the computing platform 104 may be configured to execute instructions of vehicle applications 108 to provide features such as navigation, and battery charging/discharging control. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL). The storage 110 may be further configured to store various vehicle data 109 associated with the vehicle 102.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls (e.g., steering wheel audio buttons, a push-to-talk button, instrument panel controls, etc.) configured to invoke functions on the computing platform 104 as well as other components of the vehicle 102.

The computing platform 104 may also drive or otherwise communicate with one or more displays 116 by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with a camera 117 configured to capture images by way of the video controller 114. In some cases, the camera 117 may be mounted inside the vehicle cabin and configured to capture images inside and/or outside the vehicle (e.g. a dashcam), while in other cases the camera 117 may be mounted outside the vehicle cabin (e.g. a reverse camera). The computing platform 104 may also drive or otherwise communicate with one or more speakers 122 configured to provide audio output to vehicle occupants by way of an audio controller 120.

As discussed above, the vehicle 102 may be provided with a traction battery 124 configured to supply electric power to an electric motor (not shown) for propulsion. The traction battery 124 may be a rechargeable battery including a plurality of battery cells made of rechargeable material (e.g. Li-ion cells) for energy storage. The traction battery 124 may provide a high voltage direct current (DC) output to the electric motor. The vehicle 102 may be configured to recharge the traction battery 124 connecting to the EVSE 103 and receiving electric power therefrom. For instance, the vehicle 102 may be configured to engage and communicate with a EVSE 103 via a wired connector (e.g. a charging cable) 126 via a charging controller 128 configured to control and coordinate the energy transaction. The computing platform 104 may be configured to communicate with the charging controller 128 via one or more in-vehicle network 130. The in-vehicle network 130 may include, but not limited to, one or more of a controller area network (CAN), an Ethernet network, and a media-oriented system transport (MOST), as some examples. Furthermore, the in-vehicle network 130, or portions of the in-vehicle network 130, may be a wireless network accomplished via BLUETOOTH low-energy (BLE), Wi-Fi, or the like.

As discussed above, the charging controller 128 may be configured to control the charging of the traction battery 124 by receiving power from the EVSE 103. In the example illustrated with reference to FIG. 1, the charging cable 126 from the EVSE 103 may be connected to the vehicle via the charging controller 128. Alternatively, the charging controller 128 may be configured to support wireless charging by engaging with the EVSE 103 via a wireless charging pad (not shown) to receive the charge. In the case of wired charging, the charging cable 126 may be further provided with data communication capability. The charging controller 128 may be configured to communicate vehicle identification information, such as the vehicle identification number (VIN), to the EVSE 103 via the charging cable 126 responsive to detecting the charging cable 126 is plugged in.

Additionally or alternatively, the computing platform 104 may be configured to communicate with the EVSE 103 via a wireless connection 132. In an example, the computing platform 104 may include a wireless transceiver 134 in communication with a Wi-Fi controller 136, a Bluetooth controller 138, and other controllers such as a near-field communication (NFC) transceiver, a Zigbee transceiver, an IrDA transceiver, a radio-frequency identification (RFID) transceiver (not shown), configured to communicate with a compatible wireless transceiver 142 of the EVSE 103.

The EVSE 103 may be provided with one or more processors 140 configured to perform instructions, commands, and other routines in support of the processes described herein. The EVSE 103 may include a wireless transceiver 142 in communication with a Wi-Fi controller 144, a Bluetooth controller 146, a near field communication (NFC) controller 148, an RFID controller 150 and other controllers configured to communicate with the compatible wireless transceiver 134 of the computing platform 104. The EVSE 103 may be configured to execute instructions of station software 152 stored in a storage 154 to provide functions such as activating/deactivating charging, processing payment, wireless communication with various digital entities. The EVSE 103 may be provided with HMI controls 156 configured to provide interaction with user.

The electric power transaction between the EVSE 103 and the vehicle 102 may be controlled and coordinated via the remote server 105. The remote server 105 may be located at a remote location from the EVSE 103 and configured to communicate with various entities of the vehicle management system 100 via a wide-range network (e.g. Internet). For instance, the remote server 105 may communicate with the EVSE 103 via a wired or wireless connection 158. The remote server 105 may communicate with the vehicle 102 via a wireless connection 160 enabled by a local area network (LAN) and/or a wide area network (e.g. cellular). It is noted that the server is used as a general term representative of cloud-based processing in the present disclosure. The server 105 may include one or more server devices provided with data communicating and processing capabilities located at the same or different locations to perform various operation of the process described herein.

The remote server 105 may be configured to coordinate various aspects related to the power transaction between the EVSE 103 and the vehicle 102. For instance, the remote server 105 may be associated with and/or operated by an entity that authorizes the EVSE 103 to provide a limited or unlimited amount of charge to one or more vehicles 102 free of charge. As a few non-limiting examples, the server 105 may be associated with a fleet manager that manages one or more fleet vehicles 102 for work purposes. The fleet manager may designate the EVSE 103 as a fleet charger to allow the vehicle 102 to charge at the EVSE 103 free of charge as monitored and controlled by the server 105. Alternatively, the vehicle 102 may be a privately owned vehicle and the EVSE 103 include a charger designated by an entity of interest (e.g. employer of vehicle owner) to provide free or discounted electric charge to the vehicle 102 for work commute. The server 105 may provide the vehicle 102 with an allowance amount indicative of free or discounted energy amount provided by the EVSE 103. The allowance amount may be customized based on various factors such as prior usage of the vehicle 102, commuting distance or the like. The server 105 may be configured to authorize, limit or reject a charge request by the vehicle 102 to use the EVSE 103 based on various factors. For instance, responsive to detecting the vehicle 102 misused the battery energy (e.g. for non-work related tasks), the EVSE 105 may prevent the EVSE 103 to supply the electric charge to the vehicle 102 (to be discussed in detail below).

The server 105 may be further configured to manage the non-driving (non-propulsion) power usage of the vehicle 102. The vehicle 102 may be configured to use the electric power from the traction battery 124 not only for driving related tasks, but also for non-driving usages. For instance, the vehicle 102 may be provided with a power outlet 162 configured to output electric power from the traction battery 124 to one or more receiving entities 164 via a corresponding power port 166. As an example, the power outlet 162 may be include power receptacles configured to correspond to NEMA connectors used in North America, although power receptacles supporting other standards may be used under essentially the same concept. A DC/AC converter (not shown) may be provided between the traction battery 124 and the power outlet 162 and configured to convert the high voltage DC current from the traction battery 124 into an AC current with a corresponding voltage (e.g. 120V, 240V or the like) compatible with the configuration of the receiving entity 164.

The receiving entity 164 is used as a general term in the present disclosure and may refer to any entity, hardware, devices configured to consume electric power for various purposes. As a few non-limiting examples, the receiving entity 164 may include another electric vehicle configured to charge a battery using the electric power supplied from the traction battery 124 of the donor vehicle 102. The receiving entity 164 may further include a building provided with a home energy storage device (e.g. a battery) configured to receive electric power from the traction battery 124. The receiving entity 164 may further include one or more power devices (e.g. power tools, appliances) powered by electric energy. The server 105 may be configured to monitor and control the power supply from the vehicle 102 to the receiving entity 164 based on factors such as identity of the receiving entity 164, time, location, or the like. The location of the vehicle 102 may be collected from a global navigation satellite system (GNSS) controller 168 configured to communicate with multiple satellites and calculate the location of the vehicle 102. The GNSS controller 168 may be configured to support various current and/or future global or regional location systems such as global positioning system (GPS), Galileo, Beidou, Global Navigation Satellite System (GLONASS) and the like.

The receiving entity 164 may be provided with wireless communication capabilities. For instance, the computing platform 104 may be configured to communicate with the receiving entity 164 via a wireless connection 170. The computing platform 104 may be configured to communicate with a compatible wireless transceiver 172 of the receiving entity 164 via the wireless transceiver 134. The receiving entity 164 may be provided with a processor 174 configured to perform instructions, commands, and other routines in support of the processes of the corresponding features. The receiving entity 164 may include a wireless transceiver 172 in communication with a Wi-Fi controller 176, a Bluetooth controller 178, an NFC controller 180, and other controllers configured to communicate with the compatible wireless transceiver 134 of the computing platform 104.

Figure 2:
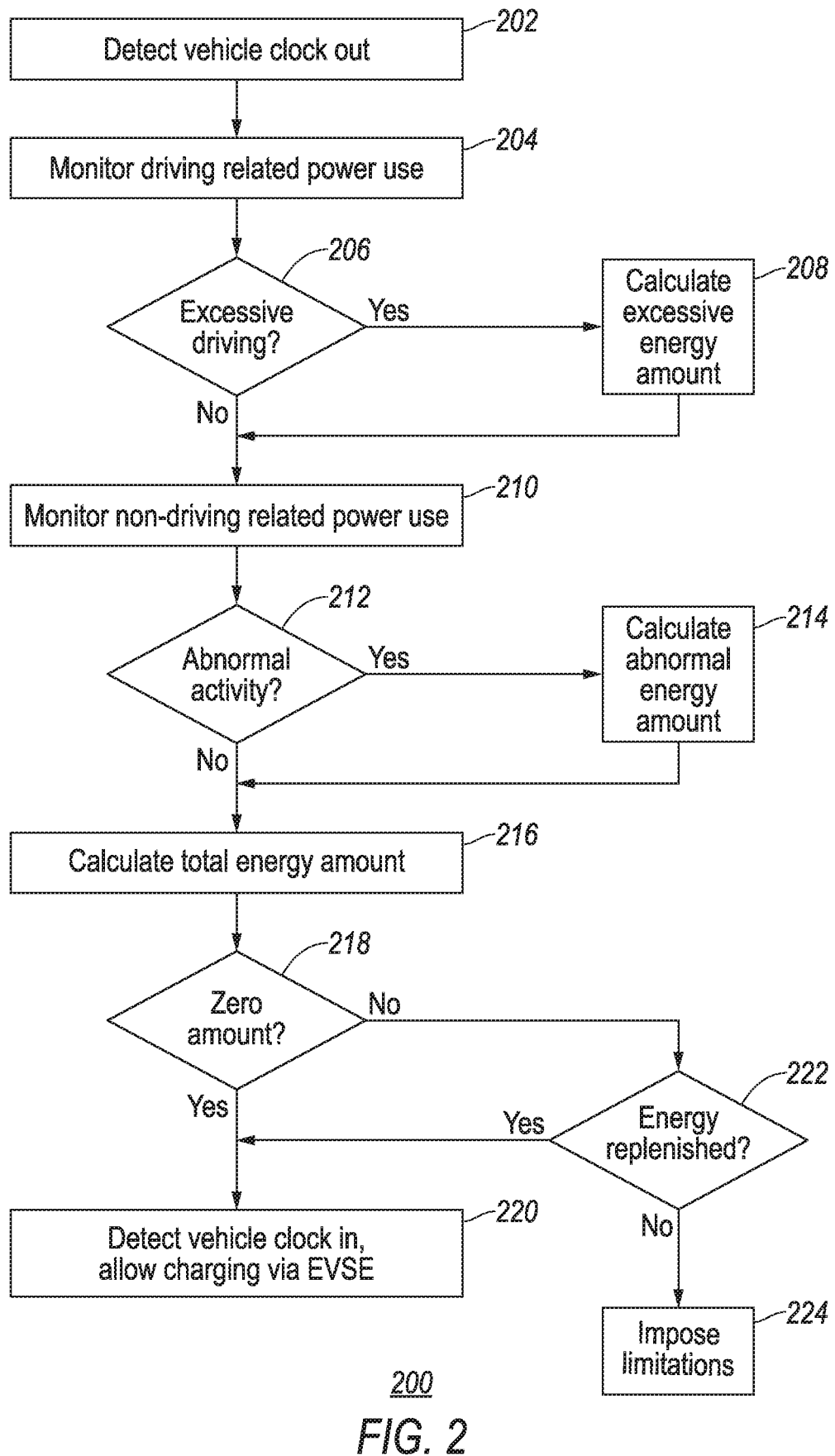
FIG. 2 illustrates a flow diagram of a process for managing the vehicle of one embodiment of the present disclosure.

Referring to FIG. 2, an example flow diagram of a process 200 for managing the vehicle power transaction of one embodiment of the present disclosure is illustrated. With continuing reference to FIG. 1, the process 200 may be individually or collectively implemented by various entities of the vehicle management system 100. For simplicity, the following description will be made with reference to the remote server 105. In addition, the process 200 may be applicable to the fleet vehicle scenario in which the vehicle 102 is a fleet vehicle owned and/or managed by a fleet manager. In the present example, the driver may be allowed to drive the fleet vehicle 102 after work for commute.

At operation 202, the remote server 105 detects the vehicle is clocked out by receiving a signal from the vehicle 102 via the wireless connection 160 responsive to a user input via the HMI. Alternatively, the server 105 may be configured to automatically clock out a vehicle responsive to various factors such as time (e.g. 5 PM), location (e.g. vehicle driving out a work geofence) or the like. Due to the fleet nature of the vehicle 102, the server 105 may be allowed to monitor operations of the vehicle 102 during the non-working hours after the clock out. Vehicle data may be sent to the server 105 via the via the wireless connection 160 in a continuous or periodical manner to facilitate the server management. The server 105 may monitor both the driving and non-driving related vehicle activities.

At operation 204, the server 105 monitors vehicle driving-related activities by receiving and processing vehicle data indicative of information such as vehicle location, driving distance to determine if an excessive driving is present. Depending on the fleet policies, the driver may be allowed to use the vehicle for commuting purposes only. Non-commuting activities (e.g. road trips or other personal use of the vehicle beyond a threshold amount) may be deemed excessive and inappropriate. The specific excessive driving may be determined in various manners. For instance, a daily driving distance threshold during non-working hours may be assigned to the vehicle 102. Additionally or alternatively, a geofence indicative of a general area of commute defined by the work and home location of the driver may be use. The server may determine the occurrence of excessive driving responsive to one or more of the above conditions being exceeded.

At operation 206, responsive to detecting the excessive driving, the process 200 proceeds to operation 208 to determine/calculate an among of energy consumed due to the excessive driving. For instance, if the daily driving distance threshold for the vehicle 102 is 50 miles and the server 105 detects a total 60 miles driving distance during the non-working hours, an energy amount corresponding to the 10 extra miles may be determined. Additionally or alternatively, if the vehicle 102 drives out of the geofence corresponding to a predefined commuting area, distance accumulated outside the geofence may be used to determine the excessive amount of energy.

If the answer for operation 206 is no indicative of no excessive driving is detected, the process 200 proceeds to operation 210 and the server 105 continues to monitor the non-driving related power usage of the vehicle 102. As discussed previously, the vehicle 102 may be configured to output electric power from the traction battery 124 for non-driving related tasks such as supplying power to the receiving entity 164. The server 105 may be configured to monitor the non-driving power transaction activities to determine an abnormal activity is present. Depending on the company policy, some power transactions may be allowed while other may be prohibited. For instance, the vehicle 102 may be configured to allow transferring a non-limited amount of power to charge another fleet vehicle (not shown) whereas charging to a non-fleet vehicle or entity may be prohibited or limited to a small allowance (e.g. 5 kWh). Additionally or alternatively, the vehicle 102 may be configured to provide power to one or more predefined types of receiving entities (e.g. certain power tools) but prohibit to provide power to other types. The identity and the type of the receiving entity may be determined by the wireless connection 170 established via the wireless transceiver 134. Additionally or alternatively, the vehicle 102 may be configured to allow power output via the power outlet 162 within a predefined geofence (e.g. a worksite location) during non-working hours.

At operation 212, the server 105 processes vehicle data to determine if an abnormal activity indicative of a violation of the company policy in regard with the non-driving related power use has occurred.

If the answer is yes, the process 200 proceeds from operation 212 to operation 214 and the server 105 calculates an amount of energy incurred due to the abnormal activity. For instance, if the allowance to charge a non-fleet entity is limited to 5 KW and the vehicle 102 transferred 7 kWh to the non-fleet entity, a 2 kWh abnormal energy amount will be determined.

At operation 216, the server calculates a total amount of excessive energy incurred by the vehicle 102 during the non-work hours. The total amount includes both the amount incurred by the excessive driving and the amount incurred by the abnormal non-driving activities.

At operation 218, if the server 105 determines the total amount of excessive energy is zero indicative of neither the excessive driving nor the abnormal power transfer has been incurred during the current clock out period, the process proceeds to operation 220 without imposing any limitations to the vehicle 102. For instance, responsive to detecting the vehicle has been clocked in and connected to the EVSE 103 the next business day, the server 105 allows the EVSE 103 to provide electric charge to the traction battery 124 of the vehicle 102 without limitations.

Otherwise, if the server 105 determines the total amount of excessive energy is not zero, the process 200 proceeds from operation 218 to operation 222 to determine if the driver has replenished the excessive amount. For instance, the company policy may allow the driver to use the vehicle 102 for personal purposes without any retribution as long as the driver replenish the excessive amount before the next clock in on his/her own expense (e.g. charging at home).

If the server 105 determines the excessive energy has been replenished before the next clock in, the process 200 proceeds to operation 220 as if no excessive energy has been incurred.

Otherwise, the process 200 proceeds to operation 224 and the server 105 imposes limitations on the vehicle 102. The limitations may include various operations on the vehicle 102 and/or the EVSE 103 charging the vehicle 102. As a few non-limiting examples, the limitations may include restricting the non-driving power transfer of vehicle during the following clock out hours. The limitation may further include restrictions on the driving distance during the following clock out hours. The limitation may further include restrictions on the EVSE 103 to charge the vehicle 102. For instance, the EVSE 103 may provide electric charges to the vehicle 102 at a higher price to compensate for the value for the excessive amount. The higher price may be calculated based on the total amount of excessive energy such that the driver is not overcharged or undercharged. For instance, if the total amount of excessive energy is 4 kWh, the EVSE 103 may charge the vehicle 102 for supplying the 4 kWh energy at the market price and then continue to provide the rest of the electric charge free of charge or at the discounted rate. The server 105 may send instructions indicative of the limitations to the vehicle 102 and the EVSE 103 via the connections 158 and 160 as appropriate. Additionally or alternatively, the server 105 may decline to authorize a request (e.g. charging request) originated from the vehicle 102 and/or the EVSE 103.

Figure 3:
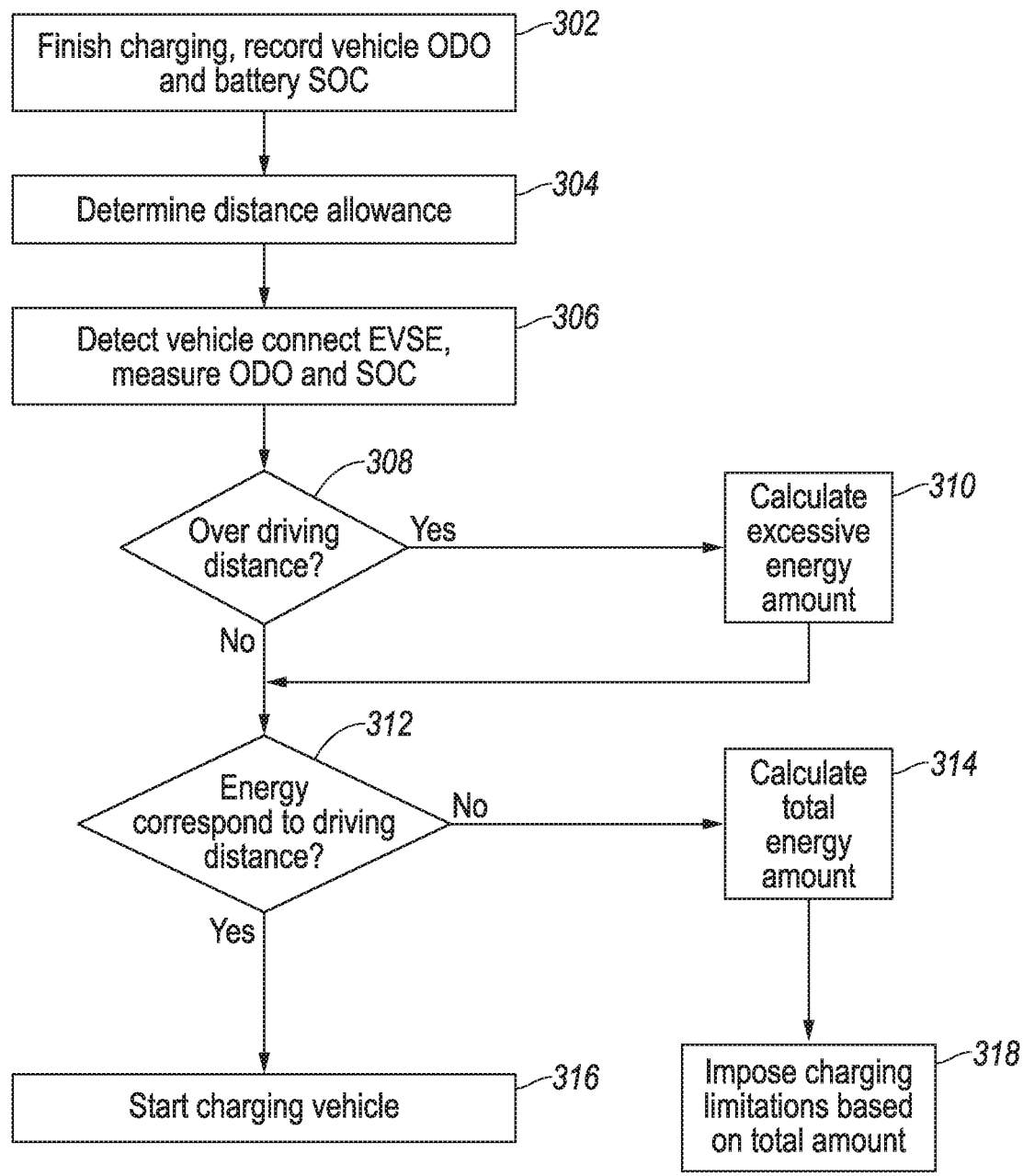
FIG. 3 illustrates a flow diagram of a process for managing the vehicle of another embodiment of the present disclosure.

Referring to FIG. 3, an example flow diagram of a process 300 for managing the vehicle power transaction of another embodiment of the present disclosure is illustrated. With continuing reference to FIGS. 1 and 2, the process 300 may be individually or collectively implemented by various entities of the vehicle management system 100. For simplicity, the following description will be made with reference to the EVSE 103 as coordinated by the remote server 105. In addition, the process 300 may be applicable to the private vehicle scenario in which the vehicle 102 may be a private vehicle owned by an individual person who is authorized to use the EVSE 103 to charge the vehicle 102 free of charge or at a discounted rate for commute purposes by an entity such as an employer. Compared with the example illustrated with reference to FIG. 2, the remote server 105 and/or EVSE 103 of the present example may have lesser access to vehicle data from the vehicle 102 during non-working hours (e.g. due to the private ownership of the vehicle 102).

At operation 302, responsive to the completing charging the vehicle 102, the EVSE 103 records an odometer and a total amount of electric charge of the vehicle 102. As discussed above, the EVSE 103 may be configured to communicate with the vehicle 102 via the wireless connection 132 through the wireless transceiver 142. Additionally or alternatively, the vehicle charging controller 128 may be provided with data communicate capability and configured to directly the send vehicle data 109 to the EVSE 103 via the charging cable 126. The odometer may be recorded in the form of milage and/or kilometer. The total amount of electric charge may be recorded in the form of an energy amount in units of kilowatt hour (kWh) and/or a state of charge in unit of percentage. Since the EVSE 103 and the remote server 105 may not have access to the vehicle data after disconnecting from the vehicle 102, the odometer and total among of electric charge data may be stored locally in the EVSE storage 154 and/or in the remote server 105 for future reference.

At operation 304, the EVSE 103 determines a commute distance allowance between the current charge and the next charge at the EVSE 103 for the vehicle 102. Depending on the usage policy, different vehicles may be assigned with different distance allowances. For instance, a first vehicle associated with a shorter commute may be assigned with a shorter distance allowance whereas a second vehicle associated with a longer commute may be assigned with a longer distance allowance. The EVSE 103 may determine the distance allowance of the vehicle 102 based on data received from the remote server 105. Additionally or alternatively, the distance allowance may be received from the vehicle 102 as a part of the vehicle data 109. In situations that vehicle 102 is shared by different users with different commuting distances, the user may be identified by the vehicle 102 collecting biometric information of the user. For instance, the vehicle 102 may capture images of the vehicle user with the camera 117 to facilitate the identification using facial recognition.

At operation 306, responsive to detecting a reconnection to the vehicle 102 (e.g. the next working day), the EVSE 103 measures the current odometer and total amount of charge of the vehicle 102. The new measurement may be compared with the previously recorded vehicle data such that the EVSE 103 may determine the total driving distance and the amount of charge consumed since the last charge. As discussed above, the vehicle 102 may be assigned with a distance allowance to receive the free or discounted charge at the EVSE 103.

At operation 308, the EVSE 103 determines if the vehicle 102 has been overly driven by comparing the determined distance with the distance allowance. If the answer is yes, e.g., indicative of the vehicle 102 has been overly driven between the last and present charge at the EVSE 103, the process 300 proceeds to operation 310 at which the EVSE 103 determines and calculates an amount of energy corresponding to the driving distance over the distance allowance. For instance, if the distance allowance is 50 miles and the actual measured driving distance is 65 miles, the extra 15 miles will be used to determine the excessive energy. Using an average energy consumption of 0.3 kWh per mile, the excessive energy amount for the vehicle 102 is approximately 4.5 kWh in the present example. Alternatively, the vehicle 102 may be allowed to drive an unlimited distance as long as the user replenish the extra energy amount (e.g. via a home charger). The EVSE 103 may take self-replenishment factor into account before determining the excessive energy amount. For instance, responsive to detecting the vehicle has been recharged at elsewhere and the excessive energy amount has been replenished before the current charging, the EVSE 103 may ignore the excessive energy without discrediting the vehicle 102 (e.g. zero excessive energy).

At operation 312, the EVSE 103 determines if the energy consumed between the last and current charge at the EVSE 103 corresponds to the driving distance. For example, the EVSE 103 determines if the battery charge has been used for any non-driving purposes such as supplying to the receiving entity 164. Depending on the usage policy, the free or discounted charge provided by the EVSE 103 may be used for commuting only and the driver may not be allowed to transfer the electric charge to another entity (e.g. another vehicle). Alternatively, the policy may allow the vehicle 102 to transfer a small amount of electric charge (e.g. 2 kWh) for non-driving purposes which may be taken into account for the determination at operation 312.

If the answer for operation 312 is yes indicative of the energy consumed corresponds to the distance driven and thus no electric charge (or an allowed amount) is used for non-driving purposes, the process 300 proceeds to operation 316 and the EVSE 103 starts to charge the vehicle 102 without restrictions.

Otherwise, the process 300 proceeds to operation 314 and the EVSE 103 calculates a total amount of excessive energy that includes the energy amount for both driving and non-driving purposes.

At operation 318, the EVSE imposes limitations on charging the vehicle 102. For instance, the EVSE 103 may provide electric charges to the vehicle 102 at a higher price to compensate for the expense for the excessive amount. The higher price may be calculated based on the total amount of excessive energy such that the driver is not overcharged or undercharged. Additionally or alternatively, the EVSE 103 may provide a reduced amount of electricity for the current charge.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A server, comprising:
an interface configured to communicate with a vehicle and a charger; and
a processor configured to:
responsive to receiving, from the vehicle, vehicle data indicative of an energy transfer amount from the vehicle to one or more receiving entities above a transfer threshold, impose a limitation on the charger to charge the vehicle by sending a message to the charger.

2. The server of claim 1, wherein the limitation includes a reduction of charging amount to charge the vehicle using the charger.

3. The server of claim 1, wherein the limitation includes an increased price for charging the vehicle using the charger, and the processor is further configured to:
calculate the increased price using an amount of electricity transferred above the transfer threshold.

4. The server of claim 1, wherein the processor is further configured to:
responsive to receiving vehicle data indicative of the energy transfer amount from the vehicle to the one or more receiving entities exceeding the transfer threshold, impose a vehicle limitation on the vehicle to reduce the transfer threshold for a future timeframe.

5. The server of claim 1, wherein the processor is further configured to:
responsive to the one or more receiving entities include an authorized entity and an unauthorized entity, determine the energy transfer amount without taking into account an amount of energy transferred to the authorized entity.

6. The server of claim 1, wherein the vehicle data is further indicative of driving operations of the vehicle, and the processor is further configured to:
responsive to detecting an excessive driving, revise the limitation, wherein the excessive driving includes a driving distance above a distance threshold.

7. The server of claim 6, wherein the excessive driving further includes vehicle driving operations outside a geofence, or outside a predefined timeframe.

8. The server of claim 1, wherein the processor is further configured to:
responsive to detecting a replenishment of electric charge for an amount of energy transferred above the transfer threshold using an energy source other than the charge, remove the limitation.

9. A charger comprising:
a connector configured to provide electric charge to a vehicle; and
a controller, programmed to:
record a first mileage and a first energy amount of the vehicle at an end of a first charge event,
responsive to detecting the vehicle connecting to the connector to perform a second charge event, obtain a second milage and a second energy amount of the vehicle,
calculate a driving distance between the first charge event and the second charge event by comparing the second milage with the first mileage,
calculate an expected energy amount using the driving distance,
calculate an actual energy amount by comparing the first energy amount with the second energy amount, and
responsive to detecting the actual energy amount being higher than the expected energy amount by a predetermined threshold, impose a limitation to charge the vehicle during the second charge event.

10. The charger of claim 9, wherein the limitation includes a charging amount reduction to charge the vehicle during the second charge event.

11. The charger of claim 9, wherein the limitation includes an increased price for charging the vehicle, the controller is further programmed to:
calculate the increased price using a difference between the expected energy amount and the actual energy amount.

12. The charger of claim 9, wherein the controller is further programmed to:
determine a distance allowance of the vehicle by receiving vehicle data from the vehicle, wherein the vehicle data is indicative of an identification of a vehicle user determined via a biometric input.

13. The charger of claim 9, further comprising:
a wireless transceiver configured to communicate with the vehicle via a wireless connection.

14. The charger of claim 9, wherein the controller is further programmed to:
responsive to detecting the driving distance being above a distance allowance, increase the limitation to charge the vehicle during the second charge event.

15. The charger of claim 9, wherein the controller is further programmed to:
calculate an extra energy amount using a difference between the expected energy amount and the actual energy amount; and
responsive to detecting a replenishment energy amount received by the vehicle using an energy source other than the charge and greater than the extra energy amount, remove the limitation.

16. A method comprising:
receiving, from a vehicle, vehicle data indicative of driving operations of the vehicle and an energy transfer from the vehicle to one or more receiving entities; and
responsive to the vehicle data being indicative of excessive driving and the energy transfer being above a transfer threshold, imposing a limitation on a charger to charge the vehicle.

17. The method of claim 16, wherein the excessive driving is indicative of a driving distance above a distance threshold during a predefined time period.

18. The method of claim 17, wherein the limitation includes an increased price for charging the vehicle using the charger, the method further comprising:
calculating a total extra energy amount based on the driving distance above the distance threshold and an amount of energy transfer above the transfer threshold; and
calculating the increased price using the total extra energy amount of energy.

19. The method of claim 18, further comprising:
responsive to the one or more receiving entities include both an authorized entity and an unauthorized entity, determine the total extra energy amount without taking into account an amount of energy transferred to the authorized entity.

20. The method of claim 16, further comprising:
responsive to detecting a replenishment of electric charge on the vehicle using an energy source other than the charger, reduce the limitation.

* * * * *